L. SEGUIN.
CONNECTING ROD HEAD FOR ROTATIVE MOTORS.
APPLICATION FILED AUG. 25, 1921.

1,401,285.

Patented Dec. 27, 1921.

INVENTOR:
Laurent Seguin
By Wm Wallace White
ATTY.

UNITED STATES PATENT OFFICE.

LAURENT SEGUIN, OF PARIS, FRANCE, ASSIGNOR TO SOCIETE DES MOTEURS GNOME ET RHONE, OF PARIS, FRANCE.

CONNECTING-ROD HEAD FOR ROTATIVE MOTORS.

1,401,285.  Specification of Letters Patent.  Patented Dec. 27, 1921.

Application filed August 25, 1921. Serial No. 495,301.

(GRANTED UNDER THE PROVISIONS OF THE ACT OF MARCH 3, 1921, 41 STAT. L., 1313.)

*To all whom it may concern:*

Be it known that I, LAURENT SEGUIN, citizen of the French Republic, residing at Paris, in the Republic of France, have invented new and useful Improvements in Connecting-Rod Heads for Rotative Motors, (for which I have filed an application in France Mar. 23, 1917, Patent Number 494,484,) of which the following is a specification.

My invention relates to a connecting rod head for star-shaped motors with rotary cylinders.

In the accompanying drawing.

Figure 1:
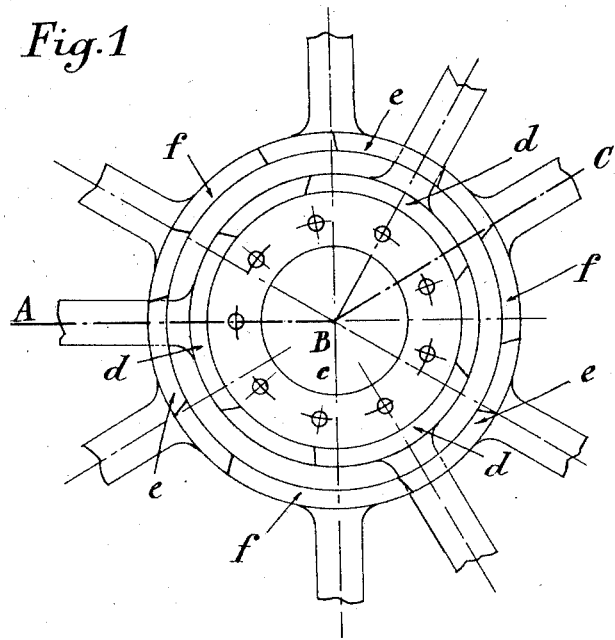
Figure 1 represents a half-section of the connecting rod head in front view.
Figure 2:
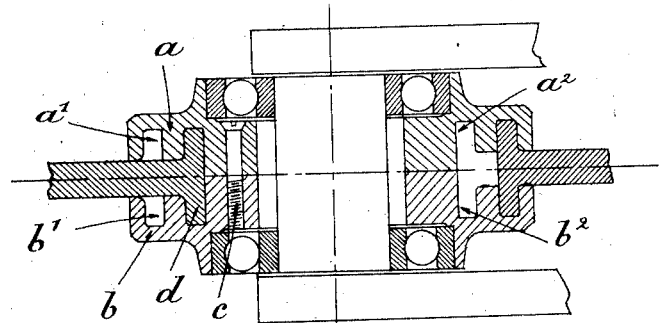
Fig. 2 is a half section on the line A—B—C, Fig. 1.
Figure 3:
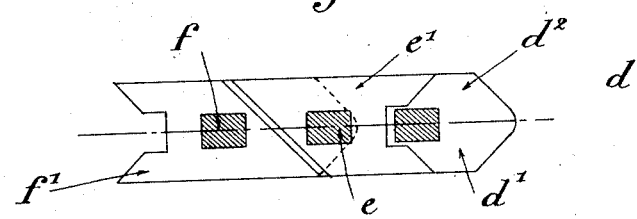
Fig. 3 represents the development of the head portions of three consecutive connecting rods.

This connecting rod head is essentially composed of two half shells $a$, $b$ each having formed therein two circular grooves $a^1$, $b^1$, $a^2$, $b^2$. These two half shells are assembled and connected together by a plurality of screws $c$. Within the inner grooves $a^2$, $b^2$ are slidably disposed the three similar connecting rods $d$, the head portions whereof are given the shape represented in Fig. 3 at $d^1$, $d^2$. Within the outer grooves $a^1$, $b^1$ are slidably disposed six connecting rods, comprising three connecting rods $e$ with the widest part $e^1$ of the head portion disposed at the side of the half shell $a$ and three other connecting rods $f$ with the widest part $f^1$ of the head portion disposed at the side of the half shell $b$. In Fig. 3 it will be observed that the arc of contact of each of the three sets of connecting rods has a considerable value, and that this is substantially the same for each set.

Having now described my invention, what I claim as new and desire to secure by Letters Patent is:

A connecting rod head for star shaped motor with rotary cylinders comprising in combination two half shells mounted loose on the crank pin, means for securing said shells to each other, grooves formed on the inner side of each shell, the grooves of one shell facing the grooves of the other shell, two groups of connecting rods, the inner end whereof is provided with arcuated portions sliding inside said grooves of the shells, the arcuated portions of one group sliding inside the inner grooves, and the arcuated portions of half the rods of the other group being provided with an enlarged portion sliding inside the outer grooves of one shell, the arcuated portions of the other half being provided with an enlarged portion sliding inside the outer grooves of the other shell.

In testimony whereof I have signed my name to this specification.

LAURENT SEGUIN.